United States Patent [19]

Kaasila

[11] Patent Number: 5,471,573
[45] Date of Patent: Nov. 28, 1995

[54] OPTIMIZED SCAN CONVERSION OF OUTLINES FOR GENERATING RASTER IMAGES

[75] Inventor: Sampo Kaasila, Plaistow, N.H.

[73] Assignee: Apple Computer, Inc., Cupertino, Calif.

[21] Appl. No.: 128,312

[22] Filed: Sep. 27, 1993

Related U.S. Application Data

[63] Continuation of Ser. No. 25,727, Mar. 1, 1993, abandoned, which is a continuation of Ser. No. 447,369, Dec. 7, 1989, abandoned.

[51] Int. Cl.$^6$ .................................................. G06T 11/00
[52] U.S. Cl. ........................ 395/141; 395/142; 395/143; 395/133
[58] Field of Search ................................ 395/140–142, 395/162–165, 143, 133; 364/718; 345/136–139

[56] References Cited

U.S. PATENT DOCUMENTS

| | | | |
|---|---|---|---|
| 4,620,287 | 10/1986 | Yam ......................................... | 394/142 |
| 4,674,058 | 6/1987 | Lindbloom et al. ..................... | 395/141 |
| 4,760,548 | 7/1988 | Baker et al. ............................. | 364/718 |
| 4,943,935 | 7/1990 | Sato ........................................ | 395/142 |
| 5,179,659 | 1/1993 | Lien et al. ............................... | 395/164 |

OTHER PUBLICATIONS

R. H. Bartels, J. C. Beatty, & B. A. Barsky, *An Introduction to Splines for use in Computer Graphics and Geometric Modeling*, 1987, pp. 173–245.

J. D. Foley & A. van Dam, *Fundamentals of Interactive Computer Graphics*, 1982, pp. 514–536.

*Primary Examiner*—Almis R. Jankus
*Attorney, Agent, or Firm*—Blakely, Sokoloff, Taylor & Zafman

[57] ABSTRACT

An arbitrary curve formulated as a quadratic B-spline with a plurality of second order Bezier curves is approximated. Applying a forward differencing to the parametric equation of the second degree Bezier curves, a second order difference coefficient is derived. By defining the error from approximating the curve with forward differencing as the distance between the approximated point on the curve and the midpoint between the end points of the curve, the second order differential coefficient is directly proportional to the error. Additionally, the error resulting from increasing the number of parametric intervals for the forward differencing is proportional to the original error. It follows from the relationship established for the second order differential coefficient, the number of parametric intervals, and the error threshold that the user specifies, the number of parametric intervals is determined. Knowing the number of required forward differencing steps allows the user to minimize the scan conversion overhead. The formulation of integer-based parametric intervals for the forward differencing obviates any multiplication or division instructions in approximating an arbitrary curve. Thus overall performance of the graphic display system is enhanced.

30 Claims, 4 Drawing Sheets

```
procedure DRAW(
    x1, y1,              {starting point of line}
    x2, y2: integer);    {ending point of line}
var m, b, dx, dy, x, y: real;
    inty: integer;
begin
    {compute coefficients m and b of y = mx + b}
    dx : = FLOAT (x2 - x1);
    dy : = FLOAT (y2 - y1);
    if dx < > 0, then                           {avoid division by zero}
        begin
            m : = dy/dx;                        {slope}
24          b : = FLOAT (y1) - m * FLOAT(x1);   {y-intercept}
26          x : = x1
            repeat
                y : = m * FLOAT(x) + b;
28              inty : = ROUND(y);
                PLOT(x,y);   {fill in output array with (x,y)}
                x : = x + 1
            until x > x2
        end
end     {DRAW}
```

Fig. 2

$F(t) = (1-t)^2 * A + 2*t*(1-t)*B + t*t*C$ —— 30
$\quad = t*t*(A-2B+C) + t*(2B-2A) + A$ —— 32

$t = s/N$ —— 34  $N = 2^n$  $n = 0, 1, 2, 3, \ldots$ —— 36

$G(s) = N*N*F(s/N)$ —— 38
$G(s) = s*s*(A-2B+C) + s*N*2*(B-A) + N*N*A$ —— 40

$G(0) = N*N*2$ —— 42
$G(1) = (A-2B+C) + 2*N*(B-A) + G(0)$ —— 44
$G(2) = 3*(A-2B+C) + 2*N*(B-A) + G(1)$ —— 46

$\quad D(G(0)) = G(1) - G(0) = (A-2B+C) + 2*N*(B-A)$ —— 48
$\quad D(G(1)) = G(2) - G(1) = 3*(A-2B+C) + 2*N*(B-A)$ —— 50
$\quad DD(G(0)) = D(G(1)) - D(G(0)) = 2*(A-2B+C)$ —— 52

$\quad \text{error} = (A+C)/2 - (A/4 + B/2 + C/4) = (A-2B+C)/4$ —— 54

$\text{error} = DD(G)/8$ —— 56

$A' = A$, $B' = (A+B)/2$, and $C' = ((A+B)/2 + (B+C)/2)/2$ —— 58 new error = error/4 —— 60

OPTIMIZED SCAN CONVERSION OF OUTLINES FOR GENERATING RASTER IMAGES

This is a continuation of application Ser. No. 08/025,727, filed Mar. 1, 1993, now abandoned, which is a continuation of application Ser. No. 07/447,369, filed Dec. 7, 1989, now abandoned.

BACKGROUND OF THE INVENTION

1. Field of the Invention

The present invention relates to the field of graphic display systems. In particular, the present invention provides a method for minimizing the scan conversion time in generating a raster image on raster output devices.

2. Background of Prior Art

Scan conversion is a process of converting an image into a bitmap description suitable for display on a graphic display system. An image is represented by collections of points, lines, curves, and surfaces and stored in a refresh buffer. Each time some or all of the displayed image changes, scan conversion must be executed to update the resulting bitmap in the refresh buffer. See, J. D. Foley and A. Van Dam, *Fundamentals of Interactive Computer Graphics*, Addison-Wesley: 1984, pg 133. In general, the scan conversion process has the following steps: (1) approximate a curve by using either recursive subdivision or forward differencing, (2) determine where the approximated points fall on the resulting bitmap by using well known techniques such as the Bresenham algorithms, and (3) turn the pixels in the resulting bitmap on and off according the locations determined in step (2).

Recursive subdivision is an iterative process of breaking a curve into two smaller curves of the same type while still preserving the original shape of the curve. By this process, the arbitrary curve, for example second order Bezier Curves, is divided into two adjoining curves. The process of subdividing the midpoints is repeated on each of the two new curves. Eventually, this iterative process produces a series of points which approximates the arbitrary curve. See Bartels, R.; Beatty, J.; and Barsky, B., *An Introduction To Splines For Use in Computer Graphics & Geometric Modeling*, (Morgan Kaufmann Publishers, Inc.: 1987) p. 216–236. It should be understood that recursive subdivision is also known as refinement. Furthermore, recursive subdivision may be generalized from midpoint subdivision to arbitrary subdivision. For ease of comprehension, recursive subdivision is illustrated in this application by midpoint subdivision only.

Forward differencing is an incremental method of calculating the coordinates of an arbitrary curve for successive values of its parameter. Many curves and surfaces are formulated as parametric polynomial functions. The task of calculating points on a curve can be reduced to evaluating a polynomial. Under forward differencing, a parametric polynomial function is evaluated at equal intervals of its parameter. For example, in a quadratic polynomial, one adds the first partial differentials to the x and y coordinate of an end point of an arbitrary curve. This becomes the starting point for the next interval of parameters. The first partial differentials of the previous sum is added to the second partial differentials to derive the first partial differentials for the next interval of the parameters. This process is repeated until all the intervals of the parameters are accounted for. Graphically, forward differencing produces a succession of adjoining straight lines at different slopes which approximates the arbitrary curve. See Newman, W., and Sproul R., *Principles of Interactive Computer Graphics*, 2nd ed., (McGraw-Hill: 1979), p. 327–329.

Curves described by outline rendering techniques such as Bezier curves and B-Splines lend themselves naturally to manipulation by recursive subdivision and forward differencing. Outline rendering techniques are compact representations of images resulting from the use of splines to record and to generate the shape of curves. Splines are curves that are controlled by a small set of given control points and tangents. See Bartels, R.; Beatty, J.; and Barsky, B., *An Introduction To Splines For Use in Computer Graphics & Geometric Modeling*, (Morgan Kaufmann Publishers, Inc.: 1987), Chpt 9 and 10.

Bresenham algorithms are well known algorithms for generating lines, curves, and circles on a graphic display system. They are invoked hundreds or even thousands of times each time an image is created or modified. See Foley, J., and Van Dam, A., *Fundamentals of Interactive Computer Graphics*, (Addision-Wesley: 1984), Chpt. 11.

Although scan conversion serves a critical function in graphic display technology, it is a major bottleneck in updating the image display. It is therefore an object of the present invention to minimize the overhead presented by the scan conversion process. It is another object of the present invention to maximize the overall system performance of graphic display system by reducing the number of steps in executing the scan conversion process.

SUMMARY OF THE INVENTION

The present invention provides a method which is most advantageously used in conjunction with a digital computer for minimizing the scan conversion time in generating raster images on raster output devices from outline fonts.

In the preferred embodiment of the present invention, a curve being formulated as a quadratic B-spline may be approximated by a plurality of second order Bezier curves. A second order Bezier curve describes a curve by specifying three points. Applying a forward differencing to the parametric equation of the second order Bezier curves, a forward differencing coefficient is derived. By defining the error from approximating the curve with forward differencing as the distance between an approximated point on the curve and the midpoint between the end points of the curve, the forward differencing coefficient is directly proportional to the error. Additionally, the error resulting from increasing the number of parametric intervals for the forward differencing is proportional to the original error. Once the user specifies an error threshold, the number of parametric intervals is determined from the forward differencing coefficient. Knowing the number of required forward differencing steps allows the user to minimize the scan conversion overhead. The formulation of integer-based parametric intervals for the forward differencing obviates any multiplication or division instructions in approximating an arbitrary curve. Thus, overall performance of the graphic display system is enhanced.

BRIEF DESCRIPTION OF THE DRAWINGS

FIG. 2 is a simple scan converter program for calculating points on a line.

NOTATION AND NOMENCLATURE

Figure 1:
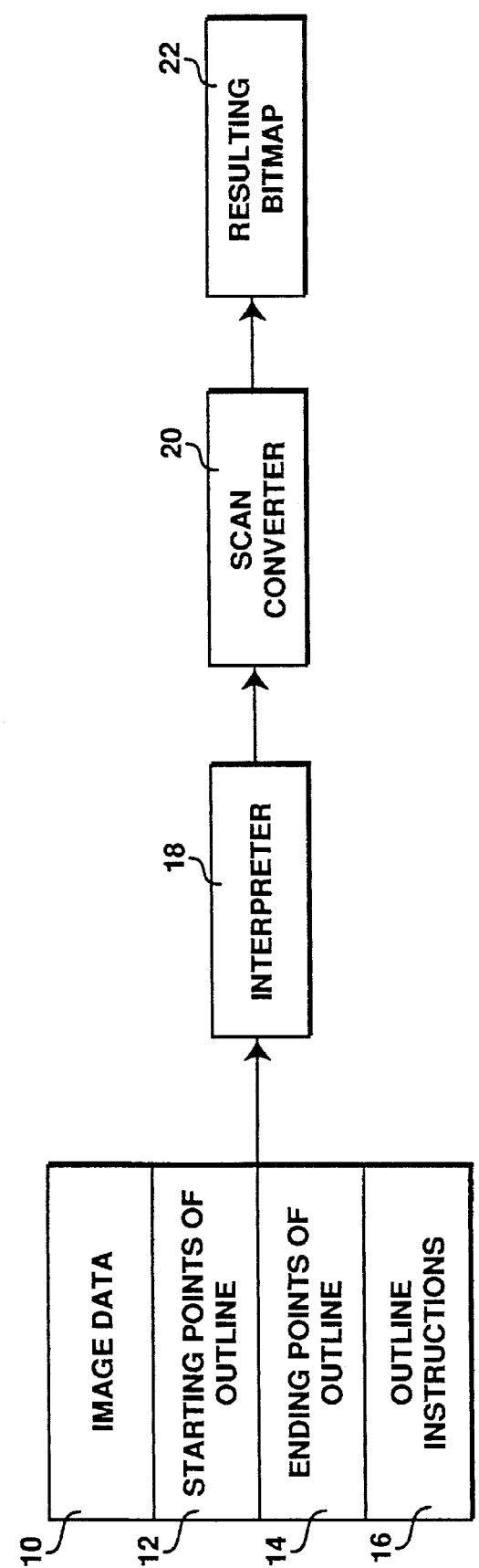
FIG. 1 is a diagram illustrating the process of converting B-spline font data into a resulting bitmap through an interpreter and a scan converter

The detailed description which follows is presented largely in terms of algorithms and symbolic representations of operations on data bits and data structures within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulation of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method of operations in operating a computer and the method of computation itself. The present invention relates to method steps for operating a computer in processing electrical or other (e.g. mechanical, chemical) physical signals to generate other desired physical signals.

The present invention also relates to an apparatus for performing these operations. This apparatus may be specially constructed for the required purposes or it may comprise a general purpose computer which is selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct a more specialized apparatus to perform the required method steps. The required structure for a variety of these machines will appear from the description given below.

DETAILED DESCRIPTION OF THE INVENTION

The following detailed description shall discuss the preferred embodiment of the present invention with reference to each decision made to reduce the scan conversion overhead. Ultimately, the goal is to allow the user to specify an error threshold while the scan conversion process automatically determines the minimum number of parametric intervals required of a forward differencing to approximate an arbitrary curve.

FIG. 1 is a diagram illustrating the process of converting image data 10 into a resulting bitmap 22 through an interpreter 18 and a scan converter 20. The image data 10 is described by splines, such as second order B-splines, and comprises starting points of a plurality of outlines 12 and a plurality of ending points of outlines 14. The interpreter 18 translates the outline instructions 16 so that the scan converter 20 can perform the appropriate sequence of operations on the outlines of an image. The scan converter works on the following principle: if a pixel center is inside or on the outline, then the pixel is always turned on. However, there is an exception to this rule, and it is for the purpose of efficiency. The scan converter 20 will not activate a pixel if its center is the first point at the lower end of the curve. The scan converter 20 also does not evaluate the spline exactly. Rather, the scan converter 20 approximates any curve incrementally with either recursive subdivision or forward differencing.

Scan conversion is a process of converting an image into a bitmap description suitable for display on a graphic display system. An image is represented by collections of points, lines, curves, and surfaces and stored in a refresh buffer. Each time some or all of the displayed image changes, scan conversion must be executed to update the resulting bitmap in the refresh buffer. See, J. D. Foley and A. Van Dam, *Fundamentals of Interactive Computer Graphics*, Addison-Wesley: 1984, pg 133. In general, the scan conversion process has the following steps: (1) approximate a curve by using either recursive subdivision or forward differencing, (2) determine where the approximated points fall on the resulting bitmap by using well known techniques such as the Bresenham algorithms, and (3) turn the pixels in the resulting bitmap on and off according the locations determined in step (2). The preferred embodiment of the present invention concerns the efficiency obtained from the forward differencing process in part (1) of the preceding discussion.

FIG. 2 is a simple scan conversion program to calculate the points on a line. Although conceptually simple, the program shown in FIG. 2 requires several multiply and divide operations as illustrated in steps 24, 26, and 28. Multiplication and division are computation-intensive operations and contribute to the scan conversion overhead as the scan conversion programs are invoked hundreds or even thousands of times whenever an image is created or modified.

Figure 3:
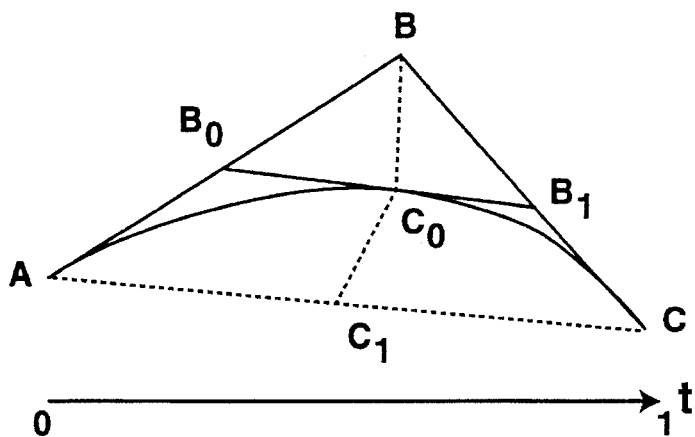
FIG. 3 illustrates the first step of a forward differencing applied on a curve AC to estimate points thereon in accordance with the preferred embodiment of the present invention. The derivation shows that the error is proportional to the forward differencing coefficient.

In contrast, the preferred embodiment of the present invention does not rely on multiply and divide operations. Rather, the present invention uses the quicker and more efficient shift operation of the registers. In FIG. 3, a curve AC is described as a B-spline curve. Splines are curves controlled by a small set of given control points and tangents. See Bartels, R.: Beatty, J.; and Barsky, B., *An Introduction To Splines For Use in Computer Graphics & Geometric Modeling*, (Morgan Kaufmann Publishers, Inc.: 1987), Chapters 9 and 10. Thus, the curve AC is approximated by the B-spline curve with control points A, B, and C. Points A and C are on the curve AC, and point B is a common tangent outside of the curve AC. As such, vectors AB and CB are tangent to points A and C, respectively. Describing any arbitrary curve with outline rendering techniques such as Bezier curves or B-splines is preferable because they provide a mechanism for breaking a large curve or surface into smaller units, each of which is easier to render on graphic output devices. Furthermore, outline rendering techniques also lend themselves naturally to recursive subdivision and forward differencing, each of which approximates points on any arbitrary curve or surface using more efficient shift register operations.

Referring again to FIG. 3, the method of breaking a second order Bezier curve into smaller curves is illustrated. Tangent vectors AB and CB are divided into halves, producing midpoints $B_0$ and $B_1$. The new line formed by joining the midpoints $B_0$ and $B_1$ intersects the curve AC at $C_0$. The point $C_0$ is at the midpoint of the line $B_0B_1$. It follows from the preceding steps that the curve AC is broken into two smaller curves $AC_0$ and $C_0C$ with point $C_0$ being the common control point. The new curve $AC_0$ has control points A, $B_0$, and $C_0$ while the curve $C_0C$ has control points $C_0$, $B_1$, and C. By repeating the same process over successive smaller curves, the approximation technique converges into a final form of the actual curve. It should be understood by one skilled in the art that the preceding steps outline the simplest case of recursive subdivision. Moreover, it should be understood that recursive subdivision may be extended to arbitrary subdivision of Bezier curves.

It is convenient to formulate the curve AC in a parametric equation. Equations 30 and 32 are parametric equations of the continuous curve AC between the internal $0 \leq t \leq 1$. If one thinks of t as time, equation 32 defines the motion of a point on the curve starting at control point A and ending at control point C as t increases from 0 to 1. As will be shown below, subdividing the parameters of the parametric equation of the curve AC is analogous to breaking the curve AC into smaller second order Bezier curves with recursive subdivision, or approximating it with forward differencing.

Forward differencing is an incremental method of calculating the coordinates of an arbitrary curve for successive values of its parameters. While recursive subdivision is related to forward differencing, approximating a curve using recursive subdivision is numerically stable, but approximating a curve into smaller straight lines using forward differencing is numerically unstable. In computer graphics, numerical stability refers to the tendency of a particular approximation method to diverge away from the true curve. In other words, recursive subdivisions would never diverge away from a true shape of an arbitrary curve, while forward differencing would sometimes do if there is insufficient numerical precision. However, forward differencing is a much quicker method of approximating an arbitrary curve than recursive subdivision. Thus, in approximating an arbitrary curve, by using either recursive subdivision or forward differencing, it is preferable to approximate an arbitrary curve using first recursive subdivision which is numerically stable until it is within the range for the forward differencing.

Referring again to FIG. 3, the time variable of Equation 30 and Equation 32 is re-defined in Equation 34 and Equation 36. The reformation of variables for Equation 30 and Equation 32 is to facilitate the breaking of a curve into straight lines by using recursive subdivision and forward differencing. Equation 38 and Equation 40 are the re-formulated parametric equations of the arbitrary curve after substituting the re-formulated variables. More importantly, equation 38 is the criterion for switching from recursive subdivision to forward differencing. In other words, when the re-formulated parametric equation G in equation 38 is equal to or greater than $N^2$ of the parametric equation F in equation 30 and equation G also fits within the machine wordsize of the computer, then the approximation of an arbitrary curve should be changed from recursive subdivision to forward differencing. In the present preferred embodiment, the machine word size is 32 bits wide.

To implement forward differencing, a parametric polynomial equation is evaluated at equal intervals of its parameters. For example, in a quadratic polynomial equation, one adds the first partial differential to X and Y coordinates of an end point of an arbitrary curve (hereinafter referred to as X[i], and Y[i], respectively). This becomes the starting point for the next interval of parameters. The first partial differentials of the previous sum is added to the second partial differentials to derive the first partial differentials for the next interval of parameters. This process is repeated until all the intervals of the parameters are accounted for. Referring again to FIG. 3 in Equation 42, the coordinate of first end point is represented as G (0). The coordinate of a point on the curve corresponding to the next interval is illustrated as G(1) in Equation 44. Likewise, the coordinate of a point on the curve corresponding to the next interval is illustrated as G(2) in Equation 46. The first partial differential from the first end point is the difference between G(1) and G(0) and is illustrated in Equation 48. In a similar fashion, the first partial differential from the next point is the difference between G(2) and G(1) and is illustrated in Equation 50. The second partial differential of the previous sum is illustrated in Equation 52. The result of Equation 52 is a constant. If we define the error as the difference between Point $C_0$ and Point $C_1$, equation 52 is also the coefficient of the second order forward differencing. Graphically, Equation 52 or the second order forward differencing coefficient is proportional to the error of using the forward differencing method. The distance between Point $C_0$ and $C_1$ is illustrated in Equation 54. The relationship of the error to the second order forward differencing coefficient is illustrated in Equation 56. It should be understood to one skilled in the art that the above discussion remains valid if we define the error as the difference between Point B to Point $C_0$.

If user desires a closer approximation of an arbitrary curve using forward differencing, he would increase the number of parametric intervals by a power of two. In a simple case where the number of intervals is doubled, the parametric variable of the curve may be defined as in Equation 58. The steps as illustrated from in Equation 40–50 are repeated. The second order differencing coefficient remained proportional to the error. However, a new error is also proportional to the error as illustrated in Equation 60. The new error refers to the error after one increases the number of parametric intervals.

Approximating arbitrary curve by using forward differencing under appropriate circumstances suggests several unexpected relationships. The relationship between the second order forward differencing coefficient with error of using forward differencing method suggests that once a threshold is specified for an error, the number of forward differencing steps is automatically known. Moreover, the relationship between the new error and the old error of using forward differencing reduces the scan conversion overhead by quantifying the number of steps required to achieve a particular level of precision in using forward differencing.

Figure 4:
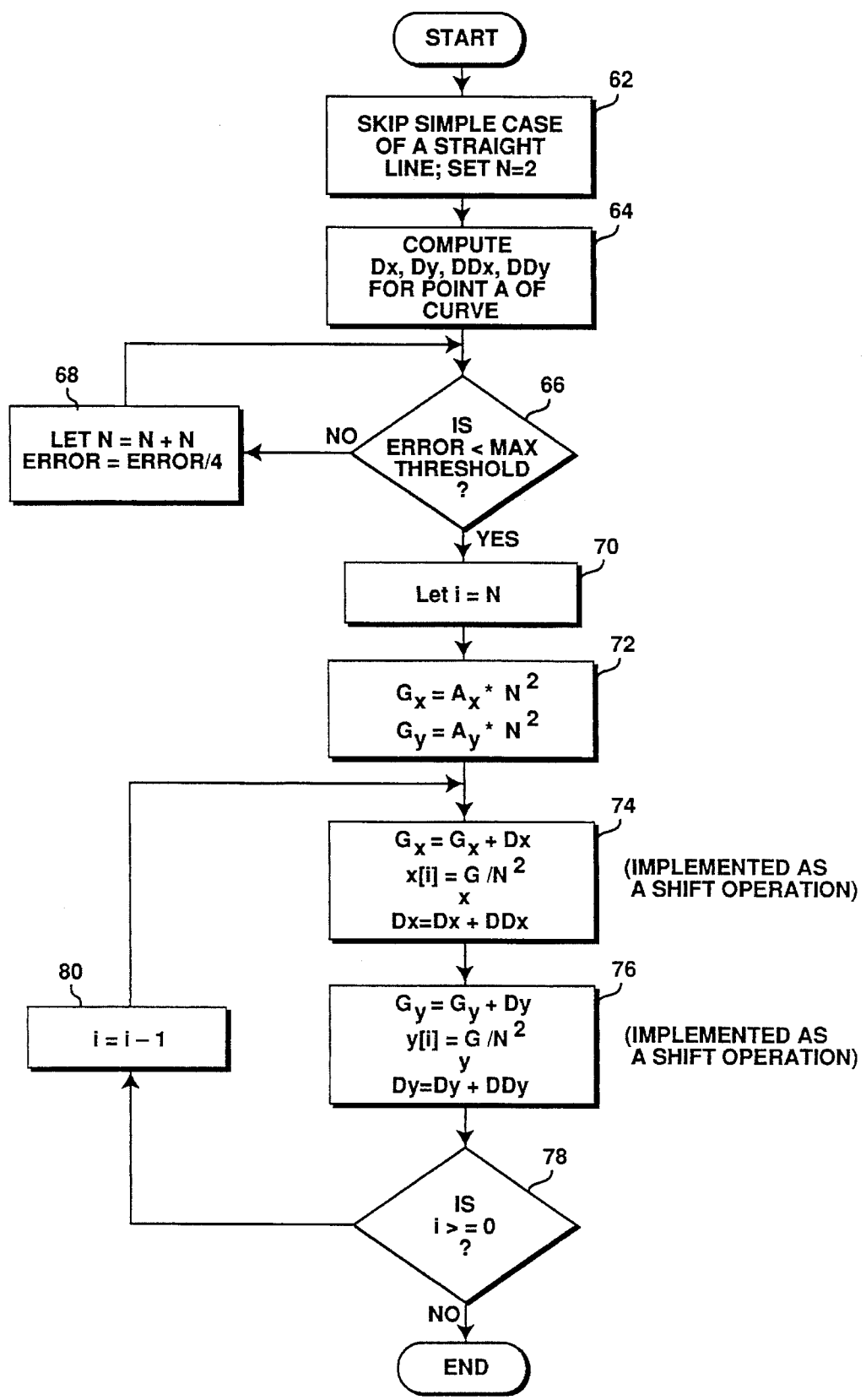
FIG. 4 is a flow chart illustrating the preferred embodiment of the present invention.

In FIG. 4, the preferred embodiment of the present invention is implemented as a computer program to be recalled whenever approximation of an arbitrary curve is required. The steps 62–80 are employed whenever curve or line generating algorithm, such as a Bresenham algorithm, is called. In Step 62, the method ignores the simple case of approximating a straight line. At the same time, the number of parametric intervals is initialized as 2, i.e., the simple case of a midpoint subdivision with one iteration. In Step 64, the first and second partial differentials of an end point A for an arbitrary curve are obtained. In Step 66 the user supplied error threshold is compared to the maximum threshold specified by the program. The maximum threshold in Step 66 is related to the pixel size of the display device. At present, the maximum threshold is a sixteenth of a pixel. If the user specified error threshold is greater or equal to the maximum threshold of the display device, then one would proceed to Step 68 where the error is determined to be a quarter of the old error. Otherwise, the procedure will proceed to Step 70 where a counter is set to N, an integer greater than 2. In Step 72, the approximation by recursive subdivision is switched to forward differencing once the reformulated equation G is equal to or greater than $N^2$ of the parametric equation F, where N is an integer. The variables of the parametric equation are re-formulated for both X and Y coordinates, X[i] and Y[], and in Step 74 and Step 76 the forward differencing of the first point is implemented as shift operation. In Step 78 the counter is checked to determine if all the parametric intervals are accounted for. If it's not, one proceeds to Step 80 where the counter is decremented, and Step 72, 74 and 76 are then repeated. The step as outlined in FIG. 4 significantly reduces the scan conversion overhead by reducing the number of steps and time required for approximating an arbitrary curve.

While the present invention has been particularly described with reference to FIG. 1–4 and with emphasis on recursive subdivision and forward differencing and on certain choices of splines and variables in reducing the scan conversion overhead, it should be understood they are for illustration purposes only and should not be taken as limitations upon the invention. In addition, it is clear that the method of the present invention has utility in any application in which graphic representation on a display device is desired. It is contemplated that many changes and modifications may be made by one skilled in the art without departing from the spirit and scope of the invention as disclosed above.

I claim:

1. A method for minimizing scan conversion processing in displaying an outline image on a display device from a resulting bitmap of a graphic display system, comprising the steps of:

approximating said outline image with recursive subdivision to represent said outline image as a plurality of segments;

fitting each segment of said plurality of segments of said outline image with forward differencing within an error threshold, said forward differencing producing a plurality of intervals, wherein said error threshold includes a distance between a point on each of said plurality of intervals and a point representing said outline image;

comparing said error threshold with a predetermined maximum error threshold, said maximum error threshold relating to a size of said resulting bitmap;

determining an optimum number of said plurality of intervals required to ensure that said error threshold is less than said maximum error threshold; and generating said optimum number of said plurality of intervals to store data representative of pixels in a refresh buffer to thereby provide said resulting bitmap to activate pixels on said display device according to said resulting bitmap of said graphic display system.

2. The method as defined by claim 1, wherein said outline image is defined parametrically, said outline image further being described by second order Bezier curves.

3. The method as defined by claim 1, wherein said recursive subdivision switches to said forward differencing when said each segment of said plurality of segments is within said size of said resulting bitmap.

4. The method as defined by claim 1, wherein said error threshold is directly proportional to a second order forward differencing coefficient of said forward differencing method.

5. The method as defined by claim 4, wherein said second order forward differencing coefficient is directly proportional to the optimum number of said plurality of intervals.

6. The method as defined by claim 4, wherein said error threshold is directly proportional to a new error threshold, said new error threshold resulting from increasing said number of said intervals.

7. A method for minimizing scan conversion processing in displaying an outline image on a display device from a refresh buffer containing a resulting bitmap of a graphic display system, comprising the steps of:

approximating said outline image with recursive subdivision to represent said outline image as a plurality of segments using a reformulated equation, wherein said reformulated equation is expressed in terms of a number of intervals;

fitting each segment of said plurality of segments of said outline image with forward differencing within an error threshold, said forward differencing producing a said number of said intervals, wherein said error threshold includes a distance between a point on each of said number of intervals and a point representing said outline image;

comparing said error threshold with a predetermined maximum error threshold, said maximum error threshold relating to a size of said resulting bitmap;

determining an optimum number of said number of said intervals required to ensure that said error threshold is less than said maximum error threshold; and generating said optimum number of said number of said intervals to store data representative of said resulting bitmap in said refresh buffer of said graphic display system, said refresh buffer thereby being used to activate pixels on said display of said system from said resulting bitmap of said graphic display system.

8. The method as defined by claim 7, wherein said outline image is defined parametrically, said outline image further being described by second Bezier curves.

9. The method as defined by claim 7, wherein said recursive subdivision switches to said forward differencing when the reformulated equation representing each of said plurality of segments is equal to or greater than the square of said, number of said intervals of a parametric equation representing said each segment of said plurality of segments and when said each segment of said plurality of segments is within said size of said resulting bitmap.

10. The method as defined by claim 7, wherein said forward differencing fits a plurality of straight lines to form an outline of said outline image, said plurality of straight lines adjoining each other, said outline having two end points, said outline further having a common control point not on said outline and which comprises an intersection mint of the tangent vectors associated with said end points of said outline.

11. The method as defined by claim 10, wherein said error threshold comprises a distance on said resulting bitmap between a midpoint of a first line segment joining said end points of said outline image and a point on said outline which is the intersection of said outline and a second line segment joining midpoints of segments joining said end points of said outline with said common control point.

12. The method as defined by claim 11, wherein said error threshold is directly proportional to a new error threshold, said new error threshold resulting from increasing said number of said intervals.

13. The method as defined by claim 7, wherein said error threshold is directly proportional to a second order forward differencing coefficient of said forward differencing method.

14. The method as defined by claim 13, wherein said second order forward differencing coefficient is directly proportional to the optimum number of said plurality of intervals.

15. A method for minimizing the scan conversion processing to display an outline of an image on a resulting bitmap of a graphic display system, said graphic display system including a display, and a refresh buffer for storing said resulting bitmap and controlling said display, comprising the steps of:

determining an optimum number of intervals required to satisfy an error threshold for performing forward differencing to approximate said outline wherein said error threshold includes a distance between a point on each of said plurality of intervals and a point representing said outline image;

approximating said outline with recursive subdivision to represent said outline image as a plurality of segments;

fitting each segment of said plurality of segments of said outline with forward differencing, said forward differencing producing said optimum number of intervals; and using said optimum number of intervals to store data representative of said resulting bitmap in said refresh buffer in order to activate pixels on said display according to said resulting bitmap of said graphic display system.

16. The method as defined by claim 15, wherein said outline is defined parametrically by second order Bezier curves.

17. The method as defined by claim 15, wherein said recursive subdivision switches to said forward differencing when said each segment of said plurality of segments is within a second error threshold.

18. The method as defined by claim 17, wherein said second error threshold is proportional to second order forward differencing coefficients of said forward differencing.

19. The method as defined by claim 18, wherein said second order forward differencing coefficients are proportional to the optimum number of said plurality of intervals.

20. The method as defined by claim 18, wherein said error threshold is proportional to a third error threshold, said third error threshold resulting from increasing said optimum number of said intervals.

21. A method of displaying an outline of an image on a resulting bitmap stored in a refresh buffer and used for controlling a display of a graphic display system which minimizes scan conversion processing comprising the steps of:

determining a first number of segments required to approximate said outline using recursive subdivision in order for forward differencing to converge upon a result within a first error threshold, wherein said first error threshold includes a distance between a point on each of said plurality of intervals and a point representing said outline image;

approximating said outline with recursive subdivision to represent said outline as said first number of segments; and fitting each of said first number of segments of said outline with forward differencing in order to store data representative of said resulting bitmap in said refresh buffer, said resulting bitmap in said refresh buffer then being used to display said outline on said display of said graphic display system.

22. The method as defined by claim 21, wherein said outline is defined parametrically by second order Bezier curves.

23. A method for minimizing scan conversion processing in displaying an outline image on a display device from a resulting bitmap of a graphic display system, comprising the steps of:

approximating said outline image with recursive subdivision to represent said outline image as a plurality of segments wherein said recursive subdivision switches to forward differencing when said each segment of said plurality of segments is within a size of said resulting bitmap;

fitting each segment of said plurality of segments of said outline image with said forward differencing within an error threshold, said forward differencing producing a plurality of intervals;

comparing said error threshold with a predetermined maximum error threshold, said maximum error threshold relating to a size of said resulting bitmap;

determining an optimum number of said plurality of intervals required to ensure that said error threshold is less than said maximum error threshold; and generating said optimum number of said plurality of intervals to store data representative of pixels in a refresh buffer to thereby provide said resulting bitmap to activate pixels on said display device according to said resulting bitmap of said graphic display system.

24. A method for minimizing scan conversion processing in displaying an outline image on a display device from a resulting bitmap of a graphic display system, comprising the steps of: approximating said outline image with recursive subdivision to represent said outline image as a plurality of segments;

fitting each segment of said plurality of segments of said outline image with forward differencing within an error threshold, said forward differencing producing a plurality of intervals, wherein said error threshold is directly proportional to a second order coefficient of said forward differencing;

comparing said error threshold with a predetermined maximum error threshold, said maximum error threshold relating to a size of said resulting bitmap;

determining an optimum number of said plurality of intervals required to ensure that said error threshold is less than said maximum error threshold; and generating said optimum number of said plurality of intervals to store data representative of pixels in a refresh buffer to thereby provide said resulting bitmap to activate pixels on said display device according to said resulting bitmap of said graphic display system.

25. The method as defined by claim 24, wherein said second order forward differencing coefficient is directly proportional to the optimum number of said plurality of intervals.

26. The method as defined by claim 24, wherein said error threshold is directly proportional to a new error threshold, said new error threshold resulting from increasing said number of said intervals.

27. A method for minimizing the scan conversion processing to display an outline of an image on a resulting bitmap of a graphic display system, said graphic display system including a display, and a refresh buffer for storing said resulting bitmap and controlling said display, comprising the steps of:

determining an optimum number of intervals required to satisfy an error threshold for performing forward differencing to approximate said outline;

approximating said outline with recursive subdivision to represent said outline image as a plurality of segments, wherein said recursive subdivision switches to said forward differencing when said each segment of said plurality of segments is within a second error threshold;

fitting each segment of said plurality of segments of said outline with said forward differencing, said forward differencing producing said optimum number of intervals; and using said optimum number of intervals to store data representative of said resulting bitmap in said refresh buffer in order to activate pixels on said display according to said resulting bitmap of said graphic display system.

28. The method of claim 27 wherein said second error threshold is proportional to second order forward differencing coefficients of said forward differencing.

29. The method of claim 28, wherein said second order forward differencing coefficients are proportional to the optimum number of said plurality of intervals.

30. The method as defined by claim 27, wherein said error threshold is proportional to a third error threshold, said third error threshold resulting from increasing said optimum number of said intervals.

* * * * *